United States Patent [19]

Kishi et al.

[11] Patent Number: 5,426,581
[45] Date of Patent: Jun. 20, 1995

[54] USING A BAR CODE SCANNER TO CALIBRATE POSITIONING OF A ROBOTIC SYSTEM

[75] Inventors: Gregory T. Kishi, Oro Valley; Salaheddin H. Obeid, Tucson, both of Ariz.

[73] Assignee: International Business Machines Corporation, Armonk, N.Y.

[21] Appl. No.: 290,577

[22] Filed: Aug. 15, 1994

[51] Int. Cl.$^6$ ............................................. G05B 19/18
[52] U.S. Cl. ................................ 364/167.01; 364/478; 235/383
[58] Field of Search .................. 364/478, 479, 167.01; 235/375, 383, 462, 472, 463; 355/97; 360/92, 91–94, 69, 71, 137; 369/34, 174

[56] References Cited

U.S. PATENT DOCUMENTS

| | | | |
|---|---|---|---|
| 4,937,690 | 6/1990 | Yamashita et al. | 360/92 |
| 4,999,671 | 3/1991 | Iizuka | 355/97 |
| 5,045,958 | 9/1991 | Leonard et al. | 360/92 |
| 5,059,772 | 10/1991 | Younglove | 235/383 |
| 5,303,214 | 4/1994 | Kulakowski et al. | 369/34 |

Primary Examiner—James P. Trammell
Attorney, Agent, or Firm—D. A. Shifrin

[57] ABSTRACT

A method and system are provided for teaching a robotic accessor the actual location of the center of targets in an automated storage and retrieval system, the actual locations being different from expected or nominal locations due to tolerances in parts and assembly. A bar code scanner, which can also be used to read the identity of items stored in the system, is used to locate and scan each target and transmit to a controller a message containing the time during each sweep of the scanning beam when one side of the target is first detected and the time during each sweep when a second, opposing side is detected. The processor calculates the physical center of the target based upon the transmitted times from one or more sweeps. The coordinates of the center are then stored and later used to accurately locate and retrieve an item stored in the system. An optional calibration technique compensates for any angular offset in the bar code scanner.

10 Claims, 5 Drawing Sheets

USING A BAR CODE SCANNER TO CALIBRATE POSITIONING OF A ROBOTIC SYSTEM

TECHNICAL FIELD OF THE INVENTION

The present invention relates to automated storage and retrieval systems, and in particular, to using a bar code scanner mounted on a robotic accessor to teach the accessor the location of various elements in a storage and retrieval system.

BACKGROUND OF THE INVENTION

An automated storage and retrieval system includes one or more banks of storage cells, used for retaining a stored item, one or more mechanical accessors, used to transport an item to and from a storage cell, and a controller. In an information library, for example, the stored items are recording media (such as magnetic tape cartridges or cassettes or optical cartridges or magazines holding one or more optical disks, collectively referred to herein as "cartridges") and the accessor transports the cartridge between the storage cells and one or more data drives in the library for reading information from or writing information to the media.

It will be appreciated that the position of the accessor should be carefully and accurately controlled by the controller in order for the accessor to retrieve the correct item and deliver it to the correct destination. Specifically referring to an information library, it is necessary for the accessor to "know" where each cell and data drive is. If the components of the library, including storage frames and transport rails, were constructed and assembled with absolute precision, it would be possible for the exact locations of the storage cells and data drives to be known and used by the library controller in directing the accessor to a desired position. However, such precision is not possible and, consequently, the accessor should be calibrated for any offset between the expected or nominal location of an element and its actual location.

In some libraries, the accessor should also have the capability to identify a cartridge before retrieving it. Conventionally, it is common to affix an identifying bar code (or other machine readable) label on each cartridge and employ a bar code reader or a vision system (such as a video camera and processor) to "read" the label. In those libraries employing a vision system to read labels, the camera can also be used to calibrate the position of the accessor. In those libraries employing a bar code scanner to read labels, however, a separate, single point sensor system has generally been used for positional calibration, if such calibration is performed at all. While both devices may result in an adequate calibration, a vision system is expensive and decoding a large array of pixels is time consuming and processor intensive; employing a separate sensor is inefficient and may also be slow.

OBJECTS AND SUMMARY OF THE INVENTION

In view of the foregoing, it is an object of the present invention to use a bar code scanner both for reading cartridge labels and for positional calibration of an accessor in an automated storage and retrieval system.

It is a further object to calibrate the accessor both for lateral positional deviations in the locations of components in the system and for angular deviations of the scanning beam.

These and other objects are achieved in this invention by moving a bar code scanner, mounted on an accessor in the storage and retrieval system, proximate the nominal or expected location of a target fiducial. The bar code scanner is activated to sweep a light beam in a y-plane toward the expected location of the fiducial and, if the fiducial is detected, a message is transmitted from the bar code scanner to a controller indicating the times the x-coordinates of the beginning and end of the fiducial were detected during a sweep. The average of the two times represents the time, relative to the beginning of the sweep, when the light beam from the bar code scanner crossed the x-coordinate of the center of the fiducial. Based upon the known x-coordinate of the accessor relative to a reference position, the actual x-coordinate of the center of the fiducial can then be determined.

To determine the y-coordinate of the center of the fiducial, the accessor is moved incrementally in the y-direction after each sweep and the y-coordinates of the top and bottom of the fiducial are averaged.

Angular offsets in the bar code scanner are also preferably determined by performing a bench-type calibration. The bar code scanner is secured to a calibration fixture and aimed at a fiducial with known coordinates. Nominally, the fiducial should be in the center of the beam sweep; however, due to parts and assembly tolerances in the bar code scanner, the angle of the beam can be offset from center. After the offset is determined, it is used during the determination of the centers of each fiducial to improve retrieval accuracy.

The x- and y-coordinates of the actual center of each fiducial in the storage and retrieval system are stored in a table and later used to direct the accessor to a retrieve a desired item.

The foregoing and other features and advantages of the invention will be apparent from the following more particular description of preferred embodiments of the invention, as illustrated in the accompanying drawings.

DETAILED DESCRIPTION OF THE INVENTION

Figure 1A:
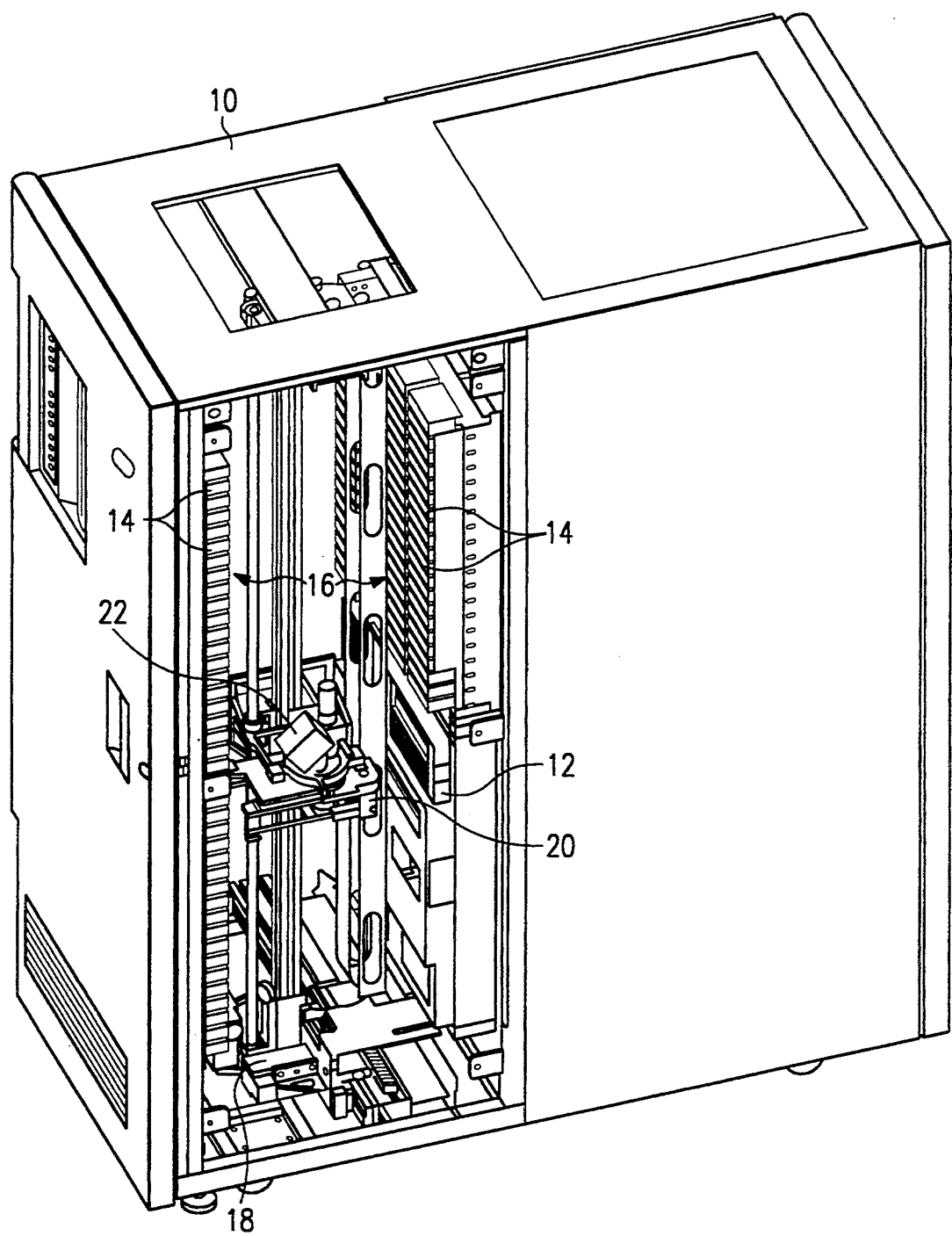
FIGS. 1A and 1B are views of an automated storage and retrieval library employing the calibration system of the present invention.
Figure 1B:
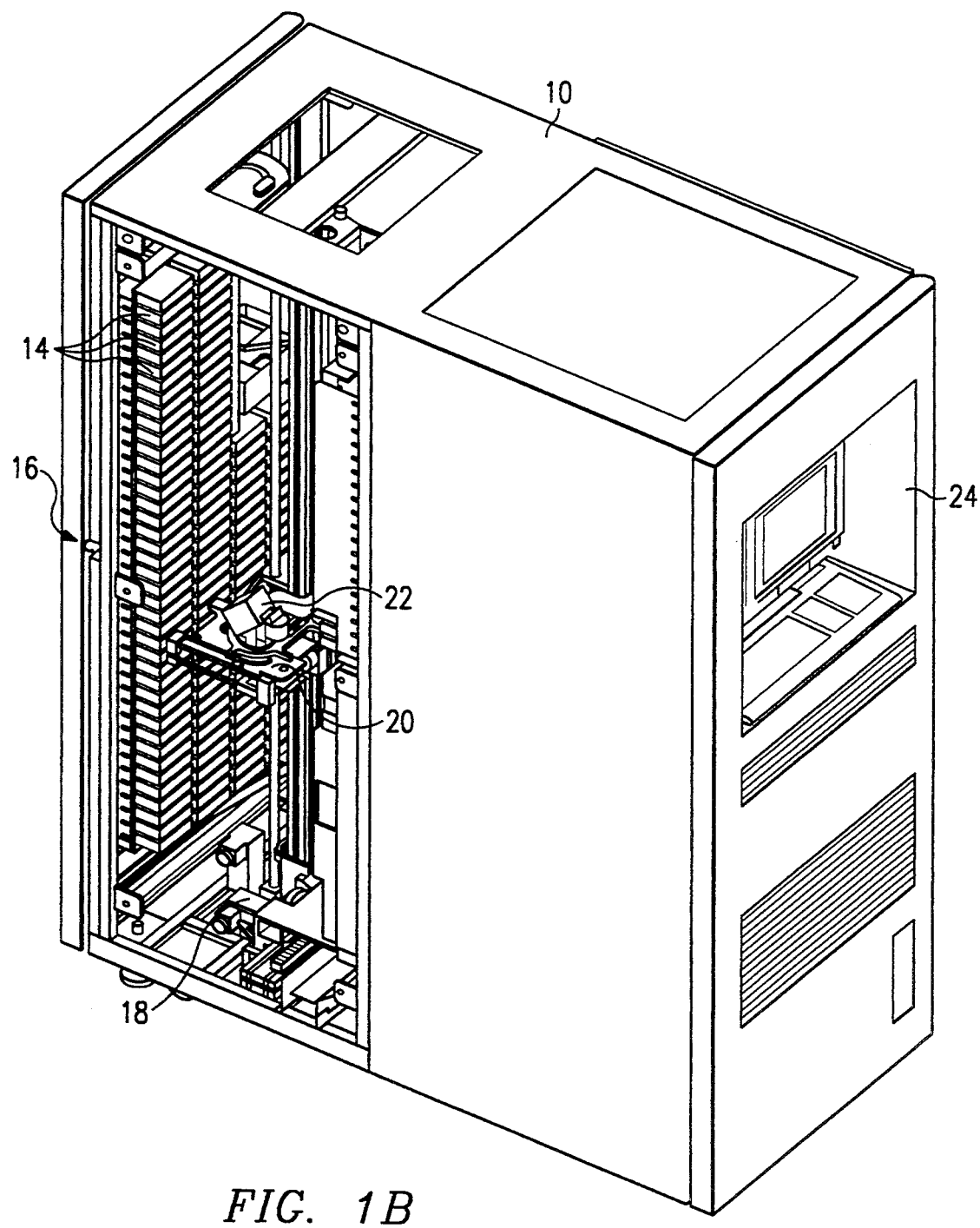

FIGS. 1A and 1B are views of an automated information storage and retrieval library 10 employing the calibration system of the present invention. The library 10 includes one or more drives 12, a plurality of cartridges 14 stored in a bank of cells 16, an accessor 18 for transporting a selected cartridge 14 between a storage cell 16 and a drive 12. The accessor 18 includes a cartridge gripper 20 and a bar code scanner 22 mounted on the gripper 20. The drives 12 can be optical disk drives or magnetic tape drives and the cartridges can contain optical or magnetic media, respectively. The library 10 also includes a library controller 24 interconnected with, and controls the actions of, the drives 12 and the accessor 18. The controller 24, which includes at least one computing processor, is further interconnected with a host processor (not shown) from which it receives access commands; information to be recorded on, or to be read from, selected cartridges 14 is transmitted between the drives 12 and the host 26 through the library controller 24 or directly between the drives 12 and the host. A preferred scanner 22 is the Model 20 IBM sold by Acc-Sort System, Inc. which can be modified to output a message to the library controller 24 used by the present invention.

Figure 2:
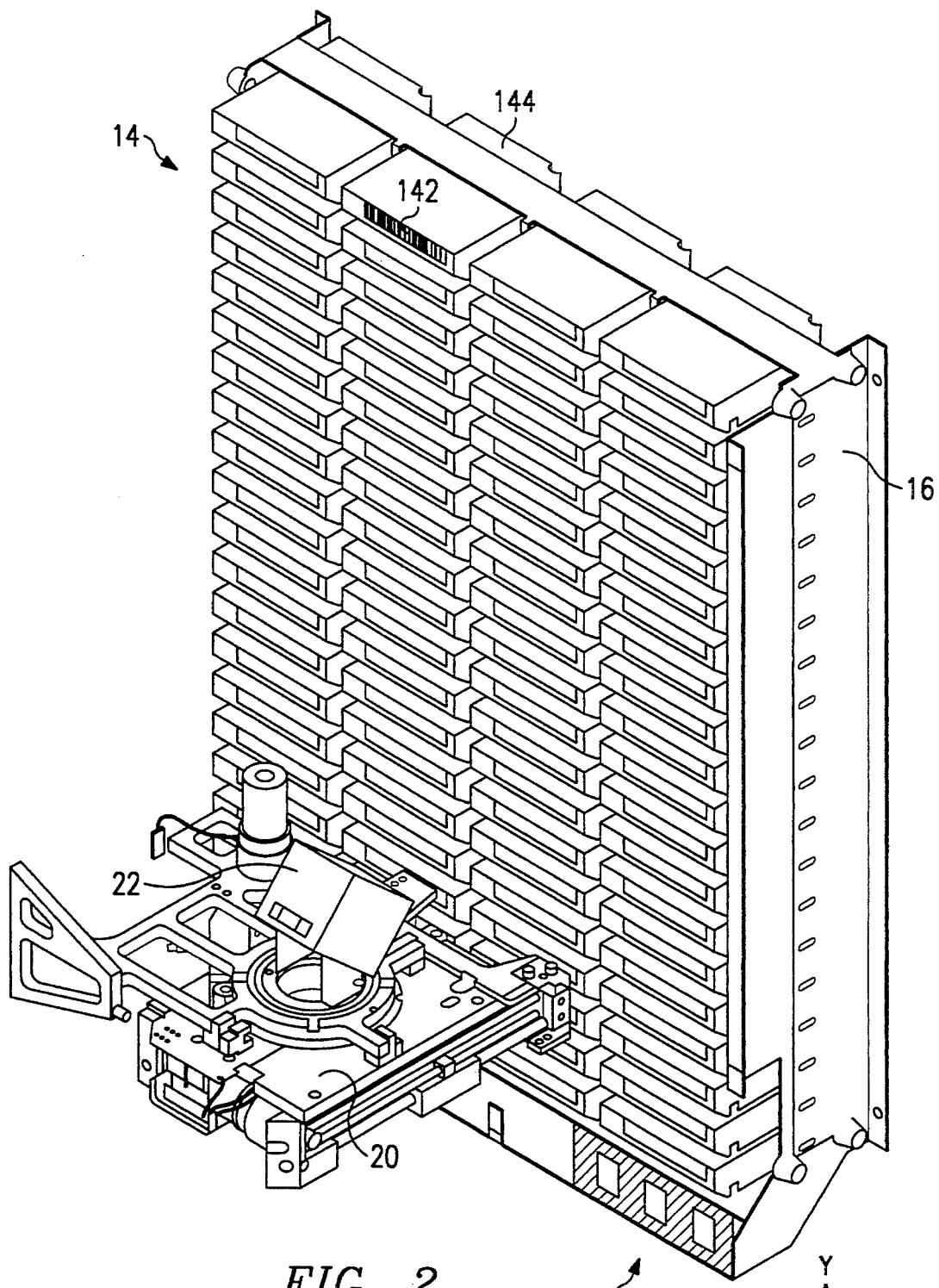
FIG. 2 is an illustration of a gripper and scanner in proximity to a bank of storage cells.
Figure 3:
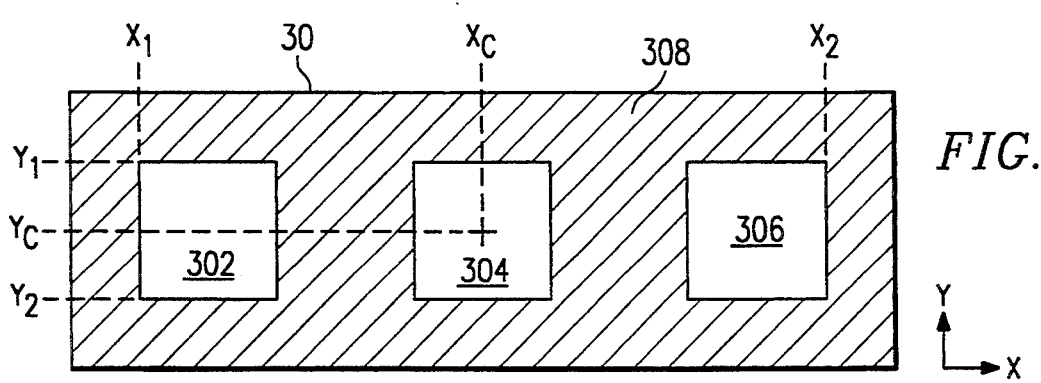
FIG. 3 is a front view of an exemplary fiducial employed in the present invention.

FIG. 2 is an illustration of the gripper 20 and scanner 22 in front of the bank of storage cells 16. The library 10 may have many such banks of cells and each bank may have any number of cells. A bank may be arranged in any of various configurations, including the 4×20 array illustrated. When a library is assembled, each bank of cells may not be perfectly aligned with each other bank in one or more of the three coordinates, x, y and z, and, further, may also not be parallel with the axes of the motion of the accessor 18 through the library 10. Consequently, positional offsets of each bank should be determined. The arrangement of the cells 16 shown in FIG. 2 is for illustrative purposes only and it is not necessary for the present invention that a bank of cells have a particular configuration, or even that the cells be grouped into defined banks. Each of the cartridges 14 has a unique identifying bar code label, such as the label 142 affixed to the front of a cartridge 144, capable of being read by the scanner 22. Also shown in FIG. 2, and in more detail in FIG. 3, is an exemplary visual target or fiducial 30 affixed to the bank of cells 16. Multiple fiducials can be located on each bank of cells 16 to provide tilt and spacing information, if desired. Similar single or multiple fiducials can be affixed to or near each other bank of cells and to or near each other component in the library 10 to which the accessor 18 will travel, such as the drives 12 and a cartridge input/output station.

The fiducial 30 is rectangular and includes three rectangular light areas or marks 302, 304, 306 on a dark background 308. By way of example only, the light areas 302, 304 and 306 can be 5 mm on each side and separated from each other by 5 mm. It will be appreciated that a fiducial with a single mark against a contrasting background can also be used although, the multiple-mark fiducial 10 is preferred for its distinctiveness relative to any other object in the library 10. The fiducial 30 has left and right sides at $x_1$ and $x_2$, respectively, top and bottom edges at $y_1$ and $Y_2$ respectively, and center coordinates of $x_c y_c$ relative to a reference position in the library of $x_o y_o$ (not shown).

Figure 4:
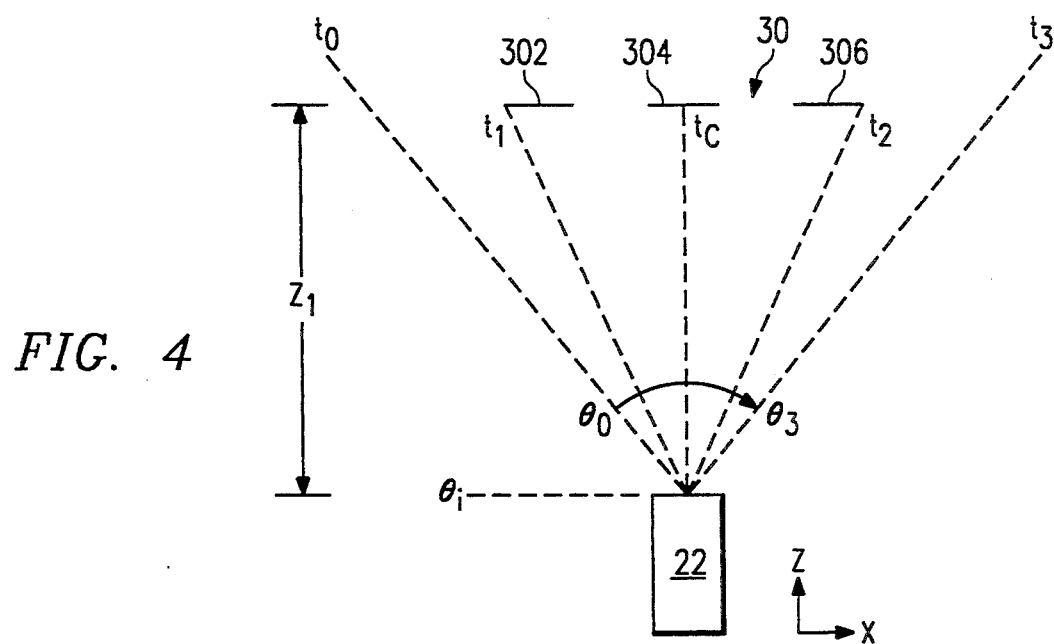
FIGS. 4, 5 and 6 are schematic top views of the scanner and fiducial showing, respectively, perfect alignment, an angular beam deviation and a lateral positional deviation.

A top schematic view of the bar code scanner 22 and fiducial 30 is shown in FIG. 4. Using a multi-sided, rotating, internal mirror, the scanner 22 sweeps a beam of light toward the fiducial 30 (in the z-direction of the y-plane) across an angle from $\Theta_0$ at an initial time $t_0$ to $\Theta_3$ at a time $t_3$ (the angles being measured from a reference angle $\Theta_1$). A typical scanner 22 may sweep over a maximum of about $\Theta_3 - \Theta_0 = 45°$ in about $t_3 = 2$ microseconds. (For clarity, the angle of the beam sweep has been exaggerated in the FIGS.) The scanner 22 includes a timing device to measure when during a sweep the left and right sides of the fiducial (at $x_1$ and $x_2$) are detected; the time at which the light crosses the center of the fiducial can then be determined and the actual coordinates of the center $x_c y_c$ calculated and stored.

Figure 5:
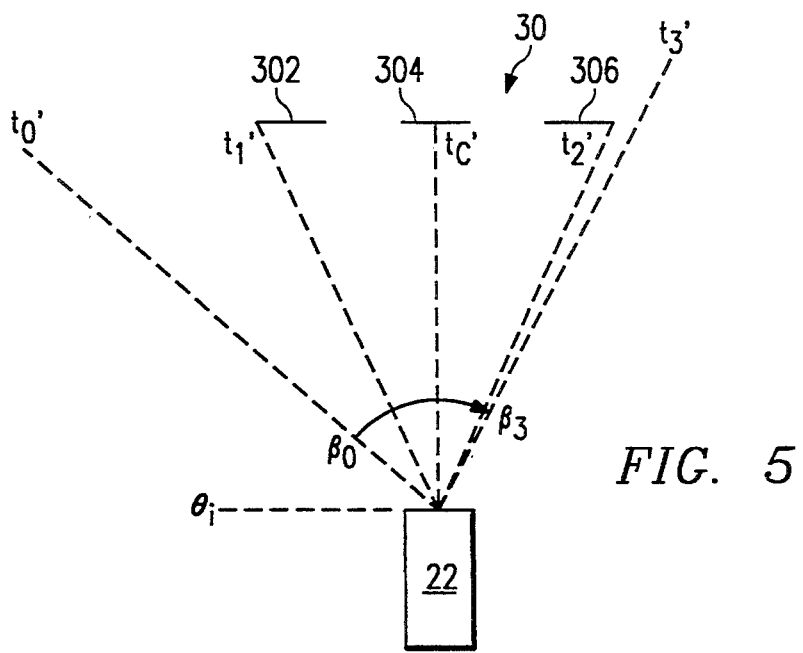
Figure 6:
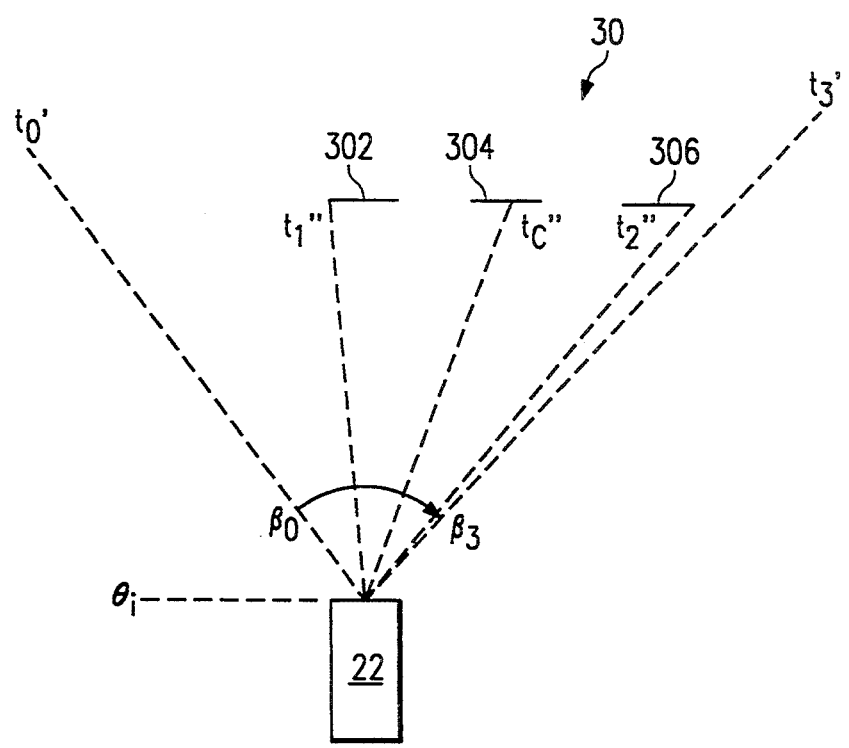

Just as there are some physical variations between libraries, so too are there variations between scanners 22, particularly in the precision with which the center of the beam sweep is established. Thus, as illustrated in FIG. 5, while the overall sweep angle $\beta_0$ to $\beta_3$ may be substantially constant (that is, equal to $\Theta_0$ to $\Theta_3$), the sweep itself may be offset by an unknown angular amount. And, even if there is no sweep offset, the positioning of the scanner 22 in front of a cell, drive or fiducial may be offset in the x-or y-directions, as illustrated in FIG. 6. Consequently, in order to obtain the most accurate positioning of the accessor 18, the foregoing offsets should be measured and the accessor 18 taught accordingly. Then, when the accessor 18 is directed by the controller 24 to retrieve a cartridge from a cell 14 in the bank 16, the offsets are factored into the positional commands transmitted to the accessor 18.

Referring again to FIGS. 4 and 5, an initial calibration procedure for the scanner 22 will be described. The scanner calibration can be performed at the factory after a scanner is manufactured or can be performed at a customer site when the scanner is installed; the procedure may also be performed during the life of the scanner if deemed necessary to counter any effects of vibration, aging or other factors. The scanner 22 is placed in a calibration fixture at a position $A_{xc,yc,z0}$ a known distance ($z_1$) from the center of the fiducial 30 on the calibration fixture (at $F_{xc,yc,z1}$) with the scanner 22 aimed directly toward the center of the fiducial 30. It has been found that a distance of about $z_1 = 17.78$ cm provides satisfactory results. Under the direction of a scanner controller (or the library controller 24 if the calibration is performed in the library 10), the scanner 22 is then activated and its beam sweeps from $\Theta_0$ at an initial time $t_0$ to $\Theta_3$ at a time $t_3$. During the sweep, the scanner 22 detects the leading edge (or left side) of the fiducial 30 at a time $t_1$ and detects the trailing edge (or right side) of the fiducial 30 at time $t_2$, all times being measured from the sweep start time $t_0$. The scanner then sends a message to the controller having the following information: the time $t_1$ in microseconds (ms) from the beginning of the scan $t_0$ to the leading edge of the fiducial; and the time $t_2$ in ms from the beginning of the scan $t_0$ to the trailing edge of the fiducial. Additional message elements, such as start-of-message and end-of-message and checksums, can be included for data integrity.

It will be apparent that, if the scanner 22 has been perfectly assembled (FIG. 4), the center of the fiducial will occur at the center of the scan such that:

$$t_c = t_3/2. \qquad \text{(Eq. 1)}$$

However, such precision is difficult, if not impossible, to achieve and would significantly raise the cost of the scanner 22. Therefore, the beam may have an angular deviation (FIG. 5) equal to the difference between $\Theta_0$ and $\beta_0$. The angular deviation is taken into account if the time the beam crosses the center $x_c$ of the fiducial 30 is calculated as:

$$t_c' = (t_2' + t_1')/2 \qquad \text{(Eq. 2)}$$

To improve accuracy, the foregoing measurement and calculation can be performed many times and the results averaged. The average is stored in an EEPROM in the scanner 22 and applied to calculations during the following calibration procedure.

Figure 7:
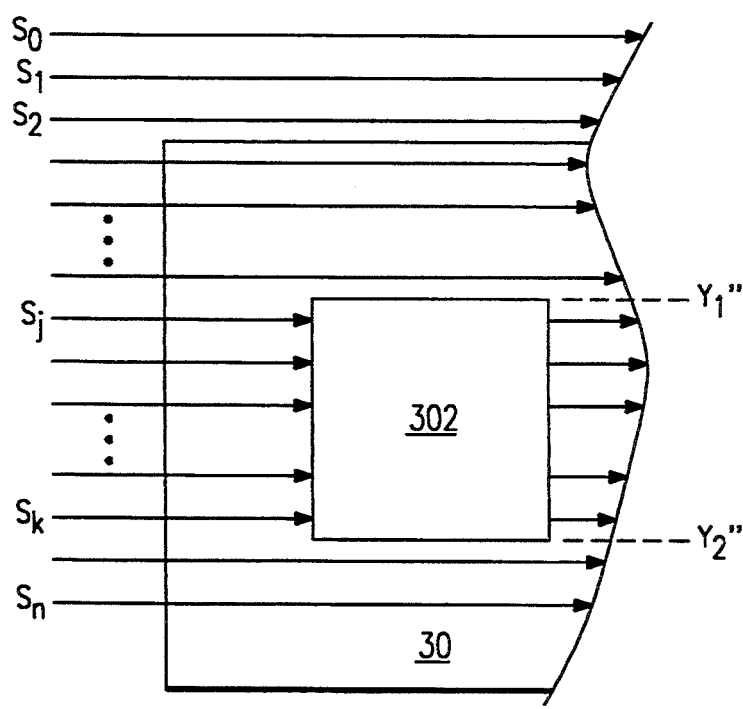
FIG. 7 is a front view of a portion of the fiducial showing exemplary scanner beam paths.

After the angular offset of the scanner 22 has been determined and stored and the scanner 22 installed in the library 10, a positional x,y measurement is performed by "teaching" the accessor 18 the location of each fiducial in the library 10. Referring to FIG. 6, the fiducial 30 will again be used to represent any fiducial in the library 10. The center of the fiducial 30 has actual coordinates $x''_c Y''_c z''_c$ (with reference to a known location in the library 10). The accessor 18 is directed by the library controller 24 to move to a location $A_{xi,yi,zi}$ above an expected or nominal position of the fiducial 30. A first scan $S_0$ is performed and if, as desired, the fiducial 30 is not detected, the scanner 22 is moved incrementally downward (in the y-direction) and another scan $S_1$ performed. (If the fiducial 30 is detected during the first scan, the scanner 22 is moved upward and the scan repeated.) The scan/move/scan steps are repeated (FIG. 7) until the scanner 22 detects the top of the fiducial 30, at scan $S_j$ and transmits a detection message. The scan/transmit/move/scan steps are repeated until the bottom fiducial 30 is no longer detected, after scan $S_k$, representing the bottom of the fiducial 30. The direction of the accessor 18 is reversed and scan/transmit/move/scan steps are repeated in the upward direction until the scanner 22 detects the bottom of the fiducial 30, at scan $S_k$. A speed for the downward motion of the accessor 18 at which measurements have been found to be sufficiently accurate is about 6.35 centimeters per second.

The time at which the light beam crosses the actual center $x''_c$ of the fiducial 30 in the x-direction during each scan is calculated in accordance with Eq. 2 and the results of the calculations from the separate scans are averaged. The angular offset stored in the EEPROM of the scanner 22 is subtracted from the calculated average value to obtain a lateral (horizontal) offset t (in milliseconds) and this result is converted from time into a distance x (in millimeters) as follows:

$$x = z_1 * \tan(\Theta) \quad \text{(Eq. 3)}$$

where $z_1$ is the expected distance between the scanner 22 and the fiducial 30 and $\Theta = t*(\Theta_3 - \Theta_0)/(t_3 - t_0)$ as shown in FIG. 4.

After the conversion, the actual x-coordinate $x''_c$ of the center of the fiducial 30 is determined to be the x-position of the accessor 18 $A_{xi}$ plus the horizontal offset. The y-coordinate $Y''_c$ of the actual center of the fiducial 30 is determined by calculating the average y-position of the accessor 18 between the top and bottom edges of the fiducial 30; that is, $y''_c = (y''_2 + y''_1)/2$.

Preferably, one other determination should be made. If the horizontal offset of the scanner 22 from the center of the fiducial 30 is too large (that is, if the scanner 22 is too far to one side of the fiducial 30), a parallax error associated with the measured times will be undesirably large and the resulting calculations may not be sufficiently accurate. Consequently, the horizontal offset x is compared with a threshold value $x_{th}$ which is computed as follows: The above calculations have been based upon the assumption that the distance from the scanner 22 to the fiducial 30 is a predetermined known distance $z_1$ (such as 7 inches). However, the actual distance $z_{act}$ may vary by some error $\epsilon_z$ such that $z_{act} = z_1 + \epsilon_z$. The error in the z-direction will cause an error $\epsilon_x$ in the calculated lateral offset; the actual lateral offset is $x_{act} = x + \epsilon_x$. The relationship between the two errors is $\tan(\Theta) = \epsilon_x / \epsilon_z$. Based upon the design tolerances of the library 10, the drives 12, the storage cells 16, the accessor 18, the gripper 20 and other related hardware, the maximum errors $\epsilon_{x\text{-}max}$ and $\epsilon_{z\text{-}max}$ can be estimated and their relationship is $\tan(\Theta_{max}) = \epsilon_{x\text{-}max}/\epsilon_{z\text{-}max}$. The threshold value will, therefore, be:

$$x_{th} = z_1 * \tan(\Theta_{max}) = z_1 * (\epsilon_{x\text{-}max}/\epsilon_{z\text{-}max}) \quad \text{(Eq. 4)}$$

It has been found that a maximum acceptable error value $\epsilon_{x\text{-}max}$ is about 0.1 mm and the corresponding expected maximum error value $\epsilon_{z\text{-}max}$ is 25 mm. Therefore, the threshold value $x_{th}$ is 0.7 mm when $z_1$ is the preferred 17.78 cm.

If the calculated, tentative offset x is greater than the threshold value $x_{th}$, the accessor 18 is moved in the x-direction closer to the fiducial 30. To reduce overshoot, which would occur if the accessor 18 was moved too far in the x-direction, the accessor 18 is moved a distance equal to about 90% of the calculated tentative offset x. The scanning process is then repeated at the new location until the horizontal offset x is within the allowed tolerance $x_{th}$.

The calculated $x''_c y''_c$ position of the actual center of the fiducial 30 is stored in a table in the library controller 24 and the center of each other fiducial in the library 10 is similarly calculated and stored. From the stored position of each fiducial and the known location of each cell within the bank of cells 16 relative to the fiducial 30, the position of each cell in the library 10 relative to the reference point $x_0 y_0$ can be determined for the accessor 18 to be moved with sufficient accuracy for proper cartridge storage and retrieval despite imperfect assembly of the library 10. The position of each data drive 12 in the library 10 can be similarly determined.

While the invention has been particularly shown and described with reference to preferred embodiments thereof, it will be understood by those skilled in the art that various changes in form and details may be made therein without departing from the spirit and scope of the invention.

What is claimed is:

1. A method for teaching a robotic accessor the location of a target in an automated storage and retrieval system, the accessor being capable of motion in at least orthogonal x and y directions, the method comprising the steps of:
    a) moving the accessor to an initial position $R_{xi,yi,zi}$ proximate a nominal location of a target, the target having first and second opposing sides;
    b) activating a bar code scanner to sweep a light beam from an angle of $\beta_0$ at a time $t_0$ to an angle $\beta_3$ at a time $t_3$ in a $y_i$ plane toward the expected location of the target;
    c) determining whether the first side of the target is detected by the bar code scanner;
    d) if the first side of the target is not detected:
        d1) moving the accessor in a first direction to a new position $R_{xi,yv,zi}$ where $Y_v$ equals the previous y-coordinate of the accessor plus an incremental value; and
        d2) repeating steps b) and c) until the first side of the target is detected;
    e) when the first side of the target is detected, storing values $Y_v$, $t_1$ and $t_2$, where $t_1$ and $t_2$ are measured from time $t_0$ and are the times it takes the light beam to strike the first and second sides, respectively, of the target;

f) moving the accessor in the first direction to a new position $R_{xi,yv,zi}$ where $Y_v$ again equals the previous y-coordinate of the accessor plus an incremental value;

g) determining if the first side of the target is still detected;

h) if the first side of the target is still detected, repeating said steps e) through g); and i) when the first side of the target is no longer detected, calculating the position of the center of $P_{xc,yc,zi}$ of the target.

2. The method of claim 1, wherein said calculating step i) comprises the steps of:

k) calculating the coordinate $P_{xc}$ by:

k1) for each position $Y_v$ at which the first side of the target was detected by the scanner, determining the time $t_c = (t_1 + t_2)/2$ at which the light beam crossed the center of the target;

k2) averaging all of the determined $t_c$'s;

k3) converting the average $t_c$ into a coordinate $x_c$ relative to the position $R_{xi}$ of the accessor; and k4) obtaining $P_{xc} = R_{xi} + x_c$; and l) calculating the coordinate $P_{yc}$ = the average of the y coordinates of the accessor at which the light beam first and last detected the target.

3. The method of claim 2, wherein said step k) of calculating the coordinate $P_{xc}$ further includes subtracting an offset value, calculated during a calibration of the bar code scanner, from the average of the determined $t_c$'s.

4. The method of claim 2, further comprising the steps of:

m) comparing the value $x_c$ with a threshold value;

n) if $x_c$ is greater than the threshold value, moving the accessor in the x direction to a new position $R_{xw,yi,zi}$ where $x_w$ equals the previous x-coordinate plus an incremental value; and o) repeating said steps b) through i) until $x_c$ is less than the threshold value.

5. The method of claim 1, further comprising the steps of:

p) comparing the value $x_c$ with a threshold value;

q) if $x_c$ is greater than the threshold value, moving the accessor in the x direction to a new position $R_{xw,yi,zi}$ where $x_w$ equals the previous x-coordinate plus an incremental value; and r) repeating said steps b) through i) until $x_c$ is less than the threshold value.

6. The method of claim 1, wherein said calculating step i) comprises the steps of:

s) when the first side of the target is no longer detected, moving the accessor in a second direction, opposite the first direction $A_{zi,yv,zi}$ where $Y_v$ again equals the previous y-coordinate of the accessor plus an incremental value;

t) activating the bar code scanner to sweep a light beam from the angle of $\beta_0$ at a time $t_0$ to the angle $\beta_3$ at a time $t_3$ in a $Y_i$ plane toward the expected location of the target;

u) determining whether the first side of the target is detected by the bar code scanner;

v) if the first side of the target is not detected:

v1) moving the accessor to a new position $A_{xi,yv,zi}$; and v2) repeating steps s) and t) until the first side of the target is detected;

w) when the first side of the target is detected, storing values $Y_v$, $t_1$ and $t_2$, where $t_1$ and $t_2$ are measured from time $t_0$ and are the times it takes the light beam to strike the first and second sides, respectively, of the target; and x) when the first side of the target is detected, calculating the position of the center of $P_{xc,yc,zi}$ of the target.

7. An automated storage and retrieval system, comprising:

a bank of storage cells for retaining data storage units, each data storage unit having an identifying bar code label affixed thereto;

a fiducial affixed to said bank of storage cells having a center with a known nominal location and first and second opposing sides;

a system controller having a memory for storing an actual center of said fiducial;

a data drive interconnected with said controller;

an automated accessor, interconnected with said controller, capable of motion in orthogonal x and y directions and having a measurable position of $R_{x,y}$; and a bar code scanner affixed to said accessor interconnected with said controller to project a light beam towards said fiducial with a sweep range of $\Theta_0$ to $\Theta_3$, each sweep beginning at a time $t_0$, wherein said bar code scanner:

has a positional calibration mode wherein said controller determines the location of said fiducial relative to a reference position and a retrieval mode wherein said controller directs said bar code scanner to scan an identifying label of a data storage unit;

comprises a timer, which is reset to the time $t_0$ at the beginning of each beam sweep, for measuring the amount of time $t_1$ between the beginning of each sweep $t_0$ and the time when the beam crosses the first side of the fiducial and for measuring the amount of time $t_2$ between the beginning of each sweep $t_0$ and the time when the beam crosses the second side of the fiducial;

and further comprises a transmitter for transmitting a message comprising $t_1$ and $t_2$ to said system controller.

8. The system of claim 7, said system controller comprising a processor for:

calculating the time when the beam crosses the center of said fiducial as $t_c = (t_1 + t_2)/2$;

converting the time $t_c$ into a position $x_c$ relative to the x-position $R_x$ of said accessor; and determining the position $P_{xc}$ of the center of said fiducial relative to the reference position.

9. The system of claim 8, said system controller further comprising an accessor controller for:

directing that said accessor be moved to an initial position $R_{xi,yi,zi}$ proximate the nominal position of said fiducial, after which said system controller activates sweeps of said bar code scanner in an attempt to detect said fiducial; and after each sweep of said bar code scanner, directing that said accessor be moved to a new position $R_{xi,yv,zi}$, where $Y_v$ equals the previous y-coordinate of said accessor plus an incremental value, until said fiducial is no longer detected by said bar code scanner;

whereby, after each sweep of said bar code scanner, said bar code scanner transmits a message to said system controller indicating whether said fiducial was detected during the previous sweep; and whereby, said processor determines the y-coordinate of the center of said fiducial $P_c$ based upon the signals from said bar code scanner.

10. The system of claim 9, further comprising a memory device interconnected with said processor for storing the position $P_{xc,yc}$ of the center of said fiducial.

* * * * *

UNITED STATES PATENT AND TRADEMARK OFFICE
CERTIFICATE OF CORRECTION

PATENT NO. : 5,426,581
DATED : Jun. 20, 1995
INVENTOR(S) : Gregory T. Kishi and Salaheddin H. Obeid It is certified that error appears in the above-indentified patent and that said Letters Patent is hereby corrected as shown below:

At column 5, line 65, the equation "$Z_{act} = Z_1 + _{EZ}$" should be -- $Z_{act} = Z_1 + \varepsilon_z^-$.

At column 6, line 54, "$Y_i$plane" should be -- $Y_i$ plane --.

At column 7, line 55, "$A_{zi,yv,zi}$" should be -- $A_{xi,yv,zi}$ --.

Signed and Sealed this

Fifth Day of September, 1995

Attest:

BRUCE LEHMAN

*Attesting Officer*    *Commissioner of Patents and Trademarks*